Sept. 3, 1957 J. K. ROSE 2,805,411

TELEVISION RECEIVER CABINET

Filed Nov. 6, 1951 3 Sheets-Sheet 1

Inventor,
Joseph K. Rose,
By: Benjamin Schlosser Atty.

TELEVISION RECEIVER CABINET

Filed Nov. 6, 1951 3 Sheets-Sheet 2

Inventor,
Joseph K. Rose,
By: Benjamin Schlosser Atty.

Sept. 3, 1957 J. K. ROSE 2,805,411

TELEVISION RECEIVER CABINET

Filed Nov. 6, 1951 3 Sheets-Sheet 3

Inventor,
Joseph K. Rose,
By: Benjamin Schlosser Atty.

United States Patent Office 2,805,411

Patented Sept. 3, 1957

2,805,411

TELEVISION RECEIVER CABINET

Joseph K. Rose, Chicago, Ill.

Original application December 27, 1946, Serial No. 718,850, now Patent No. 2,604,536, dated July 22, 1952. Divided and this application November 6, 1951, Serial No. 255,031

1 Claim. (Cl. 340—367)

This invention relates to a television receiver or other viewing apparatus, such as a projector having a self contained screen, and particularly to means to adjust the angularity of the viewing screen in accordance with the conditions surrounding the reception of the televised images and to means for shielding the viewing screen from extraneous light.

This application is a division of my prior application, Serial No. 718,850, filed December 27, 1946, which issued as Patent No. 2,604,536 on July 22, 1952.

Images displayed on a viewing screen, as in a television receiver, can be viewed most perfectly when the eyes of the observer are near a line perpendicular to the center of the plane of the viewing surface of the image exhibiting member. Within a certain distance from this line viewing is considered satisfactory. This satisfactory viewing space in front of the image exhibiting member is contained within the confines of a truncated figure whose cross sectional area is approximately the same shape as the viewing screen, that is, rectangular with rounded corners. These sections become increasingly larger as the distance from the screen increases. The longitudinal axis of this truncated figure is the above mentioned perpendicular to the center of the image exhibiting member. Television receivers heretofore known have had fixed viewing screens, incapable of adjustment except by the process of moving the entire cabinet housing the receiver.

It is an object of this invention to provide means for adjusting the angularity of the viewing screen by rotating the screen, within predetermined limits, in one or more directions. It is another object of this invention to mount the image exhibiting member rigidly with a supporting shelf and an apertured front panel so that the assembly is movable as a unit relative to the cabinet. It is another object of this invention to provide light shields for the viewing screen that may be adjusted in accordance with the position of the viewing screen as well as the extraneous light conditions. Other objects of this invention will become apparent upon reading the following decription in conjunction with the accompanying drawings, in which:

Figure 3:
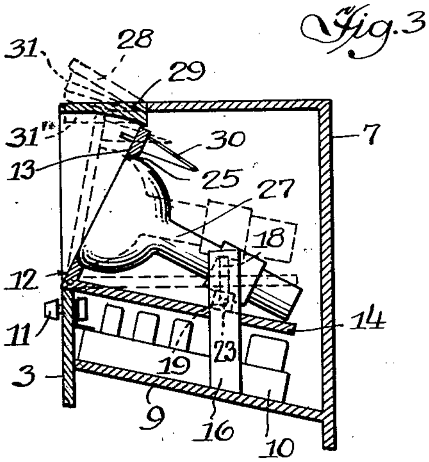
Figure 3 is a cross sectional view showing the movable shelf and panel mounting.

In the drawings, the reference numeral 2 indicates a television receiver cabinet having a front 3, a top 4, side walls 5 and 6, a back 7 and a base 8. A shelf 9 secured inside the cabinet has the television chassis 10 mounted thereon, as shown in Figure 3. Control knobs 11 are mounted on the front of the cabinet to operate the receiver. A movable assembly 12 comprising a panel 13 and a shelf 14 is pivoted to the front of the cabinet just above the control knobs 11. The panel 13 is provided adjacent its top with a handle 15 by means of which the assembly may be moved angularly between a nearly vertical position and a position approximately thirty degrees from the vertical. Sufficient friction is provided, by means hereinafter described, to hold the assembly in any position of angular adjustment within its range of movement.

Figure 4:
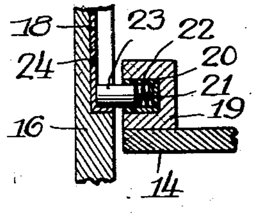
Figure 4 is a fragmentary cross sectional view showing the means of supporting the shelf for sliding movement.

An upright member 16 is positioned adjacent each side of the shelf 14. The uprights are secured to the shelf 9 in any suitable manner. The members 16 are each provided with a recess 18, as shown in Figure 4. The recess extends from adjacent the top of the member 16 to a point just above the shelf 14 when the shelf is in its lowermost position, and is curved slightly as shown in Figure 3. A block 19 is secured to the shelf 14 adjacent each recess 18. Each block 19 has a recess 20 extending inwardly from the side adjacent the slot 18. Preferably a cup shaped member 21 is secured in the recess. A coiled spring 22 is positioned in the member 21 and exerts outward pressure on a rod 23 which is postioned partly in the member 21 and extends into the recess 18. In order to maintain a smooth contact surface for the rod 23, the recess 18 is preferably provided with a U-shaped metal channel 24. The force of the spring 22 pressing the rod 23 against the metal channel creates sufficient friction against the movement of the assembly 12 to hold it in any angular position to which it may be moved.

The panel 13 is provided with an aperture 25 which is in registration with the front end 26 of a cathode ray picture tube 27 which is movable with the assembly 12. The front end 26 of the cathode ray picture tube is generally circular in cross sectional area but the aperture blocks out part of the edges so that the visible area appears to be substantially rectangular with rounded corners. This portion visible through the aperture 25 constitutes the image exhibiting member or viewing screen.

The top section 28, positioned over the panel 13, is hinged at its rear edge to the top 4. The underside of the top section 28 is curved, as indicated at 29, so that its inner surface is an arc coinciding with the path of travel of the top edge of the panel 13 when the top section is in its down position. Accordingly, no gap exists between the panel 13 and the top section 28 when the top section is down regardless of the angular adjustment of the image exhibiting member.

Figure 1:
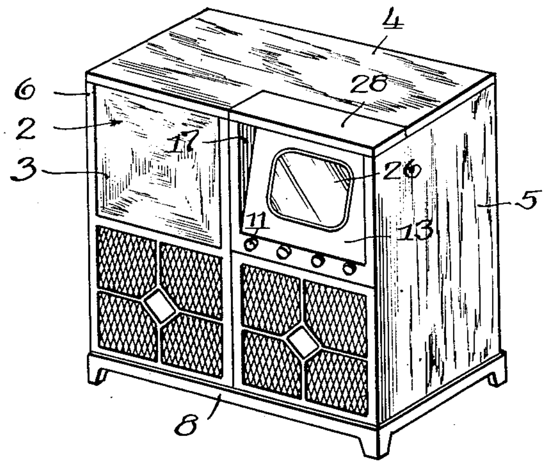
Figure 1 is a perspective view of a television receiver with the viewing screen pulled forward for viewing by seated viewers and the top section down to provide maximum top light shielding.
Figure 2:
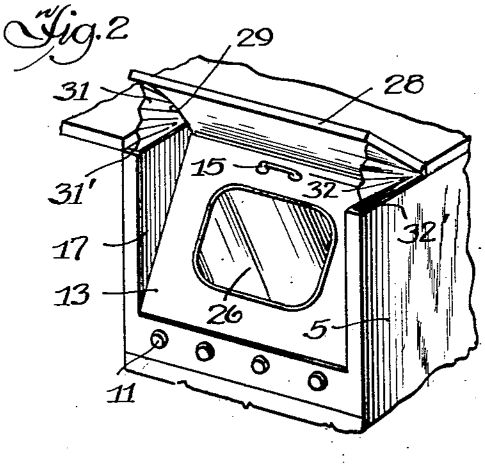
Figure 2 is a fragmentary perspective view showing the viewing screen pushed back a few degrees for viewing by standing viewers and the movable portion of the cabinet top raised angularly to increase the vertical angle of vision without eliminating the top light shielding.

In the positions of the image exhibiting member shown in Figures 1 to 3 the panel 13 and the image exhibiting member 26 slope rearwardly and upwardly from the front of the cabinet just above the control knobs 11. In this position the inset portion of the side wall 5 and the center wall 17 act as partial side light shields and the top section 28 serves as a top light shield. As the image exhibiting member is moved backwardly about the pivot it may be desirable to raise the top section 28 to increase the upward angle of vision. The panel 13 has a flange 30 extending rearwardly from its top edge, as shown in Figure 3, to prevent any gap between the lower surface of the top section and the panel 13 as the top section is raised angularly. The hinge of the top section has sufficient friction to hold the top section in any position of angular adjustment.

The angular adjustment of the front panel 13 and the tilting of the top section 28 are not necessarily related adjustments. If the viewers are seated in a darkened room it may be desired to tilt the top section upward to increase the angle of vision without changing the front panel position.

The top section 28 has a pair of fan shaped bellows 31 and 32 attached to its bottom surface adjacent its opposite lateral edges. When the top section is raised angularly the bellows 31 and 32 extend the side light shielding so as to prevent any extraneous light from passing between the top of the cabinet and the underside of the top section 28. In the down position of the top section the side light shields collapse into recesses 31' and 32' in the top of the side wall 5 and the center wall 17. If desired, the recesses may be positioned in the top section adjacent its lateral edges instead of in the walls 5 and 17.

Instead of the bellows 31 and 32, the side shields may be formed of a plurality of small interengaged sections or may be in the form of solid opaque sections.

The hinging of the top section makes it possible to reduce the height of the cabinet that would otherwise be required. The hinged top section provides an angle of vision sufficiently high to enable standing viewers to observe the screen with a relatively low cabinet. With a fixed top section the top would obscure the view of standing viewers unless it were positioned a greater distance above the image exhibiting member.

Figure 5:
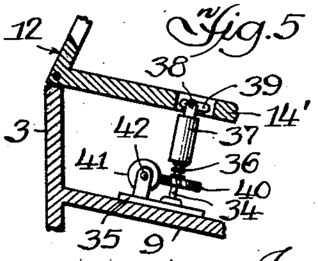
Figure 5 is a detail elevational view of a modification showing a lifting jack structure for moving the shelf.
Figure 6:
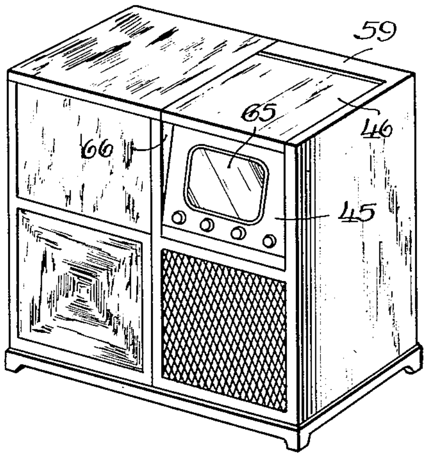
Figure 6 is a perspective view of another embodiment in which the image exhibiting assembly is pivoted adjacent its bottom.
Figure 7:
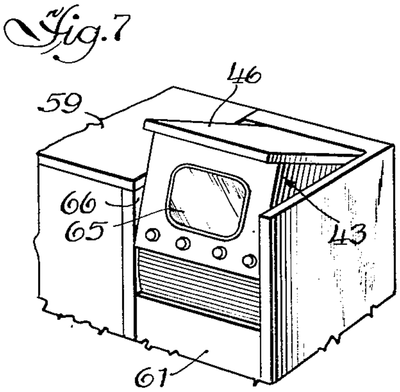
Figure 7 is a fragmentary perspective of the cabinet shown in Figure 6 with the image exhibiting assembly raised.

A modified structure is shown in Figure 5 in which positive control means is provided for moving the assembly 12 about its pivot. The control means is a lifting jack comprising a shaft 34 rotatably secured to a base 35 mounted on the shelf 9. The shaft is threaded, as indicated at 36, and a sleeve 37 is engaged with the threaded portion to move substantially vertically as the shaft is rotated. A pin 38, secured to the upper end of the sleeve extends into a recess 39 in the edge of the shelf 14' so as to move the unit 12 about its pivot as the pin moves substantially vertically. The shaft 34 is rotated by means of a gear 40 secured thereto which is engaged by a worm gear 41 mounted on a shaft 42 which extends through the side wall 5 of the cabinet. A wheel or knob (not shown) is fixed to the shaft 42 outside the cabinet so it can be rotated. It is obvious that the jack mechanism will maintain the unit 12 in any angular position to which it is moved. When the lifting jack is used the upright members 16 and their related structure may be omitted.

Figure 8:
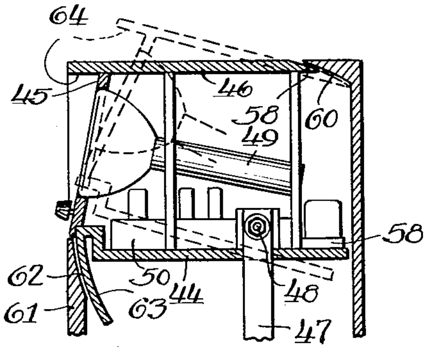
Figure 8 is a cross sectional view showing the mounting of the image exhibiting assembly.
Figure 9:
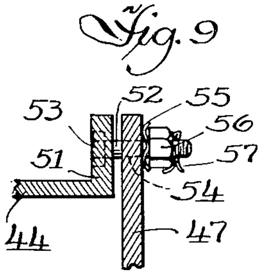
Figure 9 is a fragmentary cross sectional view showing the method of pivoting the image exhibiting assembly.
Figure 10:
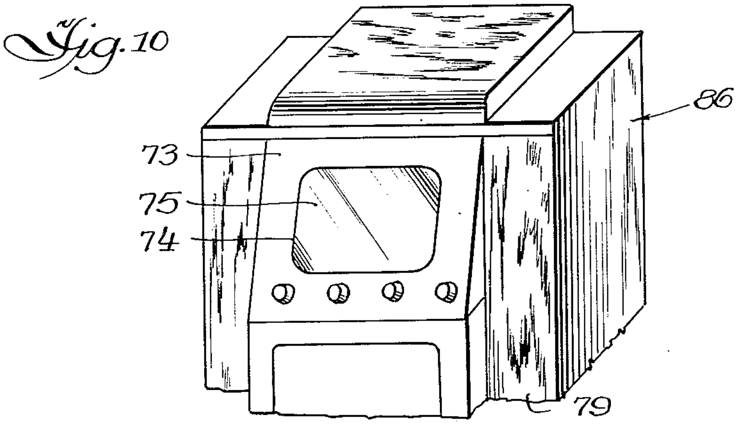
Figure 10 is a fragmentary perspective view of a television receiver in which the viewing screen is rotatable to vary the lateral angle of the screen.

In the form of the invention shown in Figures 6 to 9, inclusive, a movable assembly 43, comprising a shelf 44, a front panel 45, and a top section 46, is pivoted to a pair of oppositely disposed uprights 47, as indicated at 48, Figure 8. The picture tube 49 and the chassis 50 are both secured in fixed relationship to the assembly and rotate about the pivot therewith. The shelf 44 is provided with upwardly extending flanges 51 at its lateral edges. Rods 52 each having a head 53 embedded in one of the flanges 51 extend through the flanges and through apertures 54 in the uprights 47. The head 53 is preferably hexagonal, but may be any non-circular shape, in order to prevent rotation of the movable assembly 43 relative to the rods 52. The rods turn freely in the apertures 54. A spring washer 55 is mounted on each rod 52 and a castellated nut 56 is screwed tightly against the washer and held in place by means of a cotter pin 57.

As shown in Figure 8, the pivot 48 is positioned just above the shelf 44 at a point between the center and the back of the shelf. Many of the parts on the front portion of the chassis base 50 are radio frequency coils which are relatively light in weight. The heavier parts such as power transformer and iron core chokes are mounted on the rear portion of the chassis base. If desired, lead weights may also be added to the rear portion of the chassis base in order to balance the movable assembly at a point close enough to the rear of the cabinet to obtain the desired angular adjustments in the space available.

The heavier units which are mounted on the rear of the chassis base are generally larger than the units mounted on the front. The rear portion of the chassis base is, therefore, reduced in height, as indicated at 58, so as to bring the center of gravity of the rear portion of the assembly down so that it will be on a straight line with the center of gravity of the front portion of the assembly and the pivot point 48. When the two centers of gravity and the pivot point are aligned pivotal movement of the assembly will not disturb the balance because the moment arms on both sides of the pivot will change proportionately as the assembly is moved about the pivot and both sides will remain substantially balanced. The friction of the spring washers 55 is sufficient to hold the assembly in any angular position to which it has been adjusted. The force required to move the assembly 43 about the pivot 48 is that required to overcome the friction in the assembly plus or minus whatever slight deviation may exist from perfect balance. It is obvious that the deviation from perfect balance must not exceed the friction.

In order to permit movement of the assembly 43 about the pivot 48, the top section 46 is beveled at its rear top surface, as indicated at 58 and the forwardly extending edge of the adjacent portion of the cabinet top 59 is complementarily beveled, as indicated at 60. The top edge of the front wall 61 just below the assembly 43 is beveled on the inside, as indicated at 62, so that an apron 63, attached to the front of the shelf 44, may extend into the cabinet when the assembly 43 is in its down position. When the assembly is moved upwardly the apron closes the space between the bottom of the assembly and the top of the front wall 61 just below the assembly. Instead of the solid apron 63 a collapsible bellows may be substituted. When a bellows structure is used the front wall 61 will preferably be provided with a recess into which the bellows may be collapsed.

In the embodiment hereinabove described, the top section 46 always projects forwardly of the front panel 45, as indicated at 64, to serve as a top light shield for the image exhibiting member 65. The overhanging portion 64 of the top also serves as a convenient means for moving the assembly 43 about its pivot. When the assembly is in its down position the inset sides 66 furnish side light shielding.

Figures 11, 12, 13:
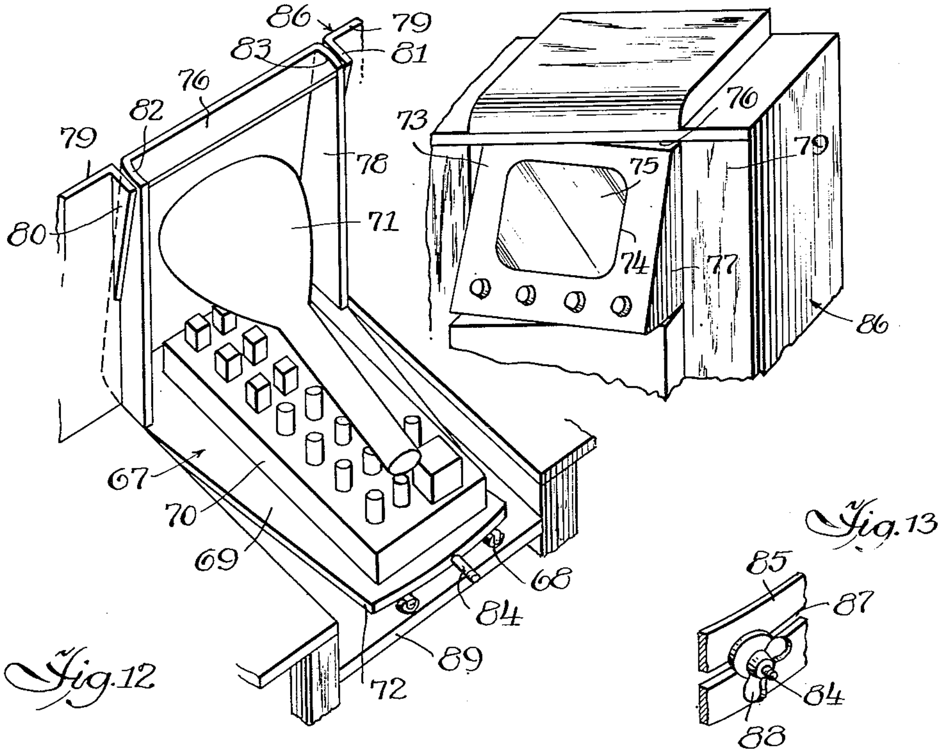
Figure 11 is a fragmentary perspective view showing the viewing screen rotated slightly from the position shown in Figure 10.
Figure 12 is a rear perspective view of the interior of the television receiver showing the rotatable platform.
Figure 13 is a detail perspective view of the means for holding the platform in any lateral position.

In the embodiment of Figures 10 to 13, inclusive, means is provided for adjusting the image exhibiting member laterally by rotating an assembly 67 pivoted at the center of its front end and mounted on rollers 68 at its rear. The platform 69, on which the chassis 70 and the picture tube 71 are mounted, has its sides tapering towards the rear, as indicated at 72, to provide clearance for lateral angular movement. The assembly 67 also includes a front panel 73 having an aperture 74 through which the image exhibiting member 75 may be viewed. The front panel 73 has a rearwardly extending top flange 76 and a pair of rearwardly extending side flanges 77 and 78. The front 79 of the cabinet adjacent the flanges 77 and 78 is also provided with rearwardly extending flanges 80 and 81. The flanges 76, 77, 78, 80 and 81 prevent access to the cabinet between the front panel 73 and the adjacent portions of the front 79 when the image exhibiting assembly 67 is in a laterally rotated position, as indicated in Figure 11. The flanges 77 and 78 are slightly rounded, as indicated at 82 and 83 to provide clearance when the assembly 67 is rotated from the straight forward position of Figure 10 to the laterally rotated position of Figure 11.

A rod 84 extends from the rear edge of the platform 69 and may be used as a handle to rotate the assembly 67 laterally within a range of about twenty degrees. A rounded, reinforced back 85 at the rear edge of the cabinet 86 is provided with a horizontally extending slot 87 through which the rod 84 extends. A wing nut 88 is threaded on the end of the rod 84 and can be tightened against the back 85 to positively hold the assembly 67 in any laterally adjusted position. It will be obvious that the shelf 89, Figure 12, upon which the assembly 67 is pivoted, may be constructed in accordance with the disclosure of the embodiments illustrated in Figures 1 to 9, inclusive, so that the assembly 67 may be adjusted vertically as well as laterally.

Although the illustrations in this application are of the direct viewing type of television receiver and the accompanying description is, for the most part, written for this type of receiver, the principles involved, of change of location or angle of image exhibiting assembly resulting in corresponding change of location or angle of image viewing screen, also apply to the projection, reflecting and other types of television receivers. In the projection receiver this movable assembly would generally contain the reflecting mirror and the front viewing screen, while in the reflecting type it would contain the reflecting mirror.

While I have described a few preferred embodiments of my invention in considerable detail, it will be understood that the description is intended to be illustrative, rather than restrictive, as many details of structure may be modified or changed without departing from the spirit or scope of my invention. Accordingly, I do not desire to be restricted to the exact details described, except as limited by the appended claim.

I claim:

In a television receiver, a cabinet, the forward edge of the top of said cabinet normally lying in the vertical plane of the front of said cabinet, a front panel movable angularly about a horizontal axis adjacent its lower edge, an image exhibiting member viewable through an aperture in said panel and movable therewith, and means for moving the portion of said cabinet top overlying said image exhibiting member upwardly about a horizontal axis positioned rearwardly of the front edge of cabinet to provide increased angle of vision relative to said image exhibiting member when said panel and said image exhibiting member are angularly moved to a position in which the upper portion of said panel is rearwardly of the front of said cabinet.

References Cited in the file of this patent

UNITED STATES PATENTS

| | | |
|---|---|---|
| 2,109,431 | McDonald | Feb. 22, 1938 |
| 2,260,721 | Linsell | Oct. 28, 1941 |
| 2,285,509 | Goshaw | June 9, 1942 |
| 2,299,393 | Johnson et al. | Oct. 20, 1942 |
| 2,350,889 | Harmon | June 6, 1944 |
| 2,368,882 | Rose | Feb. 6, 1945 |
| 2,413,922 | Jensen et al. | Jan. 7, 1947 |
| 2,499,579 | Fritsch | Mar. 7, 1950 |
| 2,566,830 | Goldsmith | Sept. 4, 1951 |

FOREIGN PATENTS

| | | |
|---|---|---|
| 100,949 | Australia | Mar. 20, 1937 |
| 828,051 | France | May 10, 1938 |
| 836,158 | France | Jan. 12, 1939 |